(No Model.)
S. R. MACE.
DEVICE FOR HANDLING LIQUIDS.
No. 491,844. Patented Feb. 14, 1893.
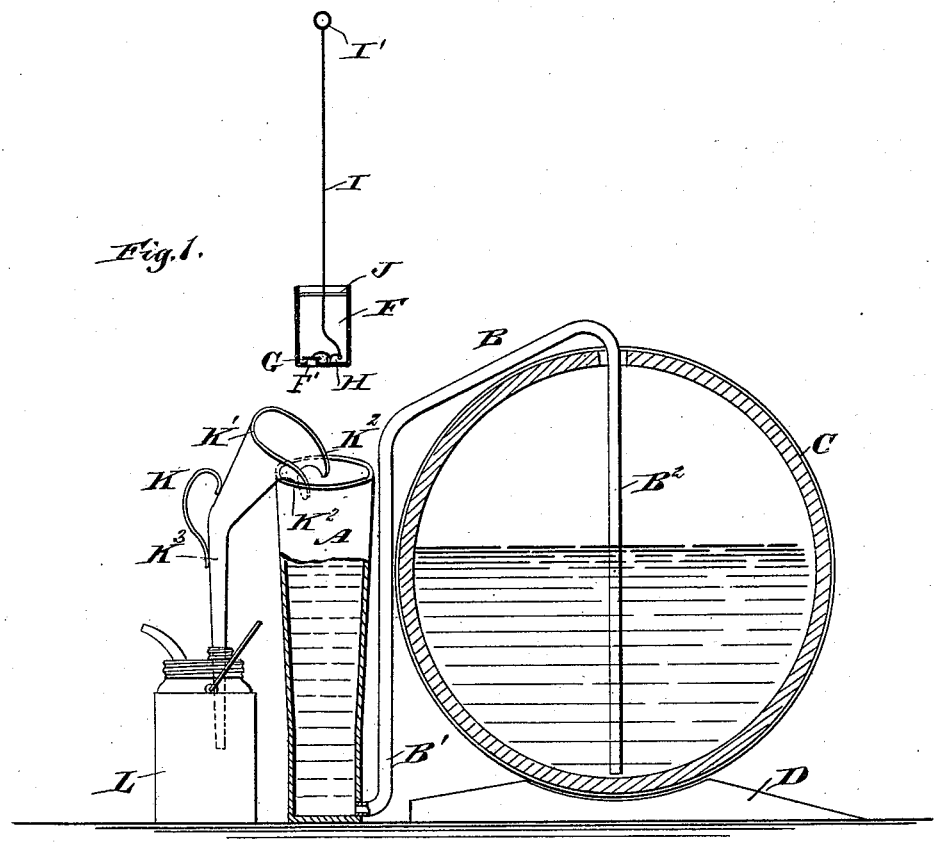
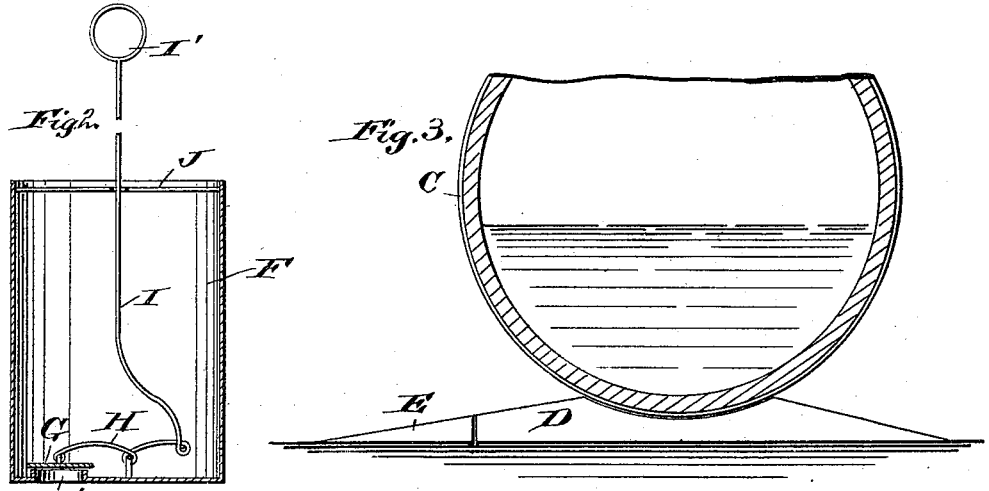
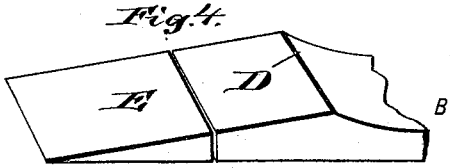
WITNESSES:
F. M. Antle
E. M. Clark
INVENTOR
S. R. Mace
BY Munn & Co
ATTORNEYS.

UNITED STATES PATENT OFFICE.

STUART R. MACE, OF MOULTON, IOWA.

DEVICE FOR HANDLING LIQUIDS.

SPECIFICATION forming part of Letters Patent No. 491,844, dated February 14, 1893.

Application filed June 13, 1892. Serial No. 436,457. (No model.)

*To all whom it may concern:*

Be it known that I, STUART R. MACE, of Moulton, in the county of Appanoose and State of Iowa, have invented a new and Improved Device for Handling Liquids, of which the following is a full, clear, and exact description.

The object of the invention is to provide a new and improved device more especially designed for handling liquids, such as oils, and which is simple and durable in construction and arranged to conveniently and quickly transfer the liquid from one receptacle to another without loss of liquid or soiling the operator, while making the transfer.

The invention consists principally of a receiving vessel provided with a siphon one leg of which is adapted to pass into the receptacle, and a dipper adapted to pass into the said receiving vessel to act as a plunger therein for starting the siphon, and adapted to withdraw a measured quantity of liquid from the said receiving vessel.

The invention also consists of certain parts and details and combinations of the same as will be described hereinafter and then pointed out in the claims.

Reference is to be had to the accompanying drawings forming a part of this specification, in which similar letters of reference indicate corresponding parts in all the figures.

Figure 1 is a sectional side elevation of the improvement as applied; Fig. 2 is an enlarged sectional side elevation of the dipper; Fig. 3 is a sectional side elevation of the supply barrel; and Fig. 4 is a perspective view of the support for the said supply barrel.

The improved device for handling liquids is provided with a receiving vessel A, preferably made conical in shape as illustrated in Fig. 1, and connected at its bottom with one leg B' of the siphon B, the other leg B² of which extends through the bung-hole into the supply barrel or vessel C containing the liquid to be delivered to a smaller vessel, such as a lamp, oil can and the like.

The supply barrel C is supported on beams D, formed on top with a segmental recess corresponding to the shape of the barrel C, the latter being rolled onto the said beams over wedges E fitting on the ends of the said beams, as will be readily understood by reference to Figs. 3 and 4. After the barrel C has been rolled into place the wedge E may be stored under the end of the barrel.

A dipper F is adapted to be passed into the receiving vessel to act as a plunger therein for starting the siphon B, as hereinafter more fully described, and also for withdrawing a measured quantity of the liquid stored in the vessel A. The dipper F is preferably made cylindrical in shape, its diameter corresponding with that of the lower part of the receiving vessel A, and the said dipper being of a size to correspond with a standard measure, so that the operator can, if so desired, keep account of the quantity of liquid withdrawn from the receiving vessel A.

In the bottom of the dipper F is arranged an inlet opening F' adapted to be closed at the inside by a valve G, held on a lever H fulcrumed in the dipper F, on the bottom thereof, as will be readily understood by reference to Fig. 1. The lever H is pivotally connected with a rod I, extending upward through the dipper F and provided at its outer end with a handle I' for conveniently manipulating the dipper and the valve G. In order to guide the rod I, the latter is passed through a spider J secured in the upper end of the dipper F. The dipper is emptied into a funnel K provided with a mouth K' formed with two lugs K² near its upper edge, the said lugs extending or hooking over the top edge of the receiving vessel A, so as to conveniently hold the funnel in place and preventing slopping over. The mouth K' of the funnel K extends at an angle to the spout K³, which latter is adapted to pass at its small end into the vessel, receptacle, lamp or other object L, to be filled.

As shown in Fig. 1, the mouth K' of the funnel K does not interfere with the free entry of the dipper F into the receiving vessel A for withdrawing a quantity of liquid from the same and emptying the said dipper into the mouth K' of the funnel to fill the receptacle L.

In starting the device the operator passes the leg B² of the siphon B through the bung-hole into the supply barrel C, so that the lower end of the leg B² extends close to the bottom of the barrel, while the bottom of the receiving vessel A is set on the floor a certain distance below the lower end of the leg B². The operator then passes the dipper F into the receiving vessel A previously supplied with a small amount of liquid and moves the dipper up and down in the lower part thereof, into which it fits snugly, so that the dipper F acts as a plunger and actuates the siphon B, which thus draws the liquid from the supply barrel C into the receiving vessel A, which it fills to the level of the liquid in the barrel C.

When it is desired to transfer the liquid passing into the receptacle A, to a device L, the funnel K is hooked on the upper edge of the receiving vessel A, while the spout K³ is passed into the device L. The operator then takes hold of the handle I' of the rod I, and passes the dipper F into the liquid contained in the receiving vessel A, so that the liquid fills the said dipper F over its top edge and through the inlet opening F', as the valve G opens by the downward pressure of the rod I. As soon as the dipper F is filled, the operator lifts said dipper by rod I, thus closing valve G and passes it over one edge of the mouth K' and then opens the valve G by moving the rod I downward so that the contents of the dipper F are emptied into the mouth K' of the funnel K, through which the liquid passes to the device to be filled. As the dipper F contains a known quantity of liquid, the operator may keep account of the amount of liquid filled into the device L.

It is understood that the liquid from the supply barrel C will always flow into the receiving vessel A when a quantity is withdrawn from the latter, so that the levels of the liquids in both the vessel A and the barrel C are maintained at the same height. Thus, when the siphon B is once started at the beginning of the operation, it continues until all the liquid is withdrawn from the barrel C into the receiving vessel A, from which it is again withdrawn in measured quantities by means of the dipper F whenever desired and as above described. The receiving vessel is to be sufficiently high to extend above level of liquid in supply vessel C.

When not in use the funnel K may be laid on its side in the mouth of vessel A so that it can drain back into vessel A, the handle K being placed low for that purpose.

Having thus described my invention, what I claim as new and desire to secure by Letters Patent, is—

1. A device for handling liquids, comprising a receiving vessel provided with a siphon adapted to pass into the supply vessel, and a dipper adapted to pass into the said vessel to act as a plunger therein for starting the siphon, and to withdraw a measured quantity of liquid from the said receiving vessel, substantially as shown and described.

2. A device for handling liquids, comprising a receiving vessel, and a dipper adapted to be passed into the said receiving vessel for withdrawing a quantity of liquid therefrom, a valve arranged in the bottom of the said dipper, a lever carrying the said valve, and a rod connected with the said lever and forming the handle for the said dipper, substantially as shown and described.

3. In a device for handling liquids, the combination with a receiving vessel containing the liquid, of a dipper adapted to be passed into the said receiving vessel to withdraw a measured quantity of liquid therefrom, and a funnel formed on its mouth with hooks adapted to engage the upper edge of the said receiving vessel, so as to permit of conveniently emptying the said dipper into the mouth of the funnel, substantially as shown and described.

STUART R. MACE.

Witnesses:
A. S. DOWNS,
JNO. W. WOOD.